No. 642,198. Patented Jan. 30, 1900.
W. E. BLAKE & R. B. ANDROS.
VALVE FOR HOT WATER RADIATORS.
(Application filed May 1, 1899.)

(No Model.)

WITNESSES.
A. D. Grover.
Fred E. Dorr.

INVENTORS.
Willard E. Blake
Randall B. Andros

THE NORRIS PETERS CO., PHOTO-LITHO., WASHINGTON, D. C.

UNITED STATES PATENT OFFICE.

WILLARD E. BLAKE AND RANDALL B. ANDROS, OF BOSTON, MASSACHUSETTS.

VALVE FOR HOT-WATER RADIATORS.

SPECIFICATION forming part of Letters Patent No. 642,198, dated January 30, 1900.

Application filed May 1, 1899. Serial No. 715,153. (No model.)

*To all whom it may concern:*

Be it known that we, WILLARD E. BLAKE and RANDALL B. ANDROS, citizens of the United States, residing at Boston, in the county of Suffolk and State of Massachusetts, have invented a new and useful Improvement in Valves for Hot-Water Radiators, of which the following is a specification.

Our invention relates to improvements in valves for use in hot-water-heating systems, although useful elsewhere; and the objects of our improvement are to avoid friction in the flow of water to or from the radiator, to wholly prevent leakage at such valve operated by an exterior handle, and to improve and simplify the mechanical construction. We attain these objects by the mechanism illustrated in the accompanying drawings, in which—

Figure 1:
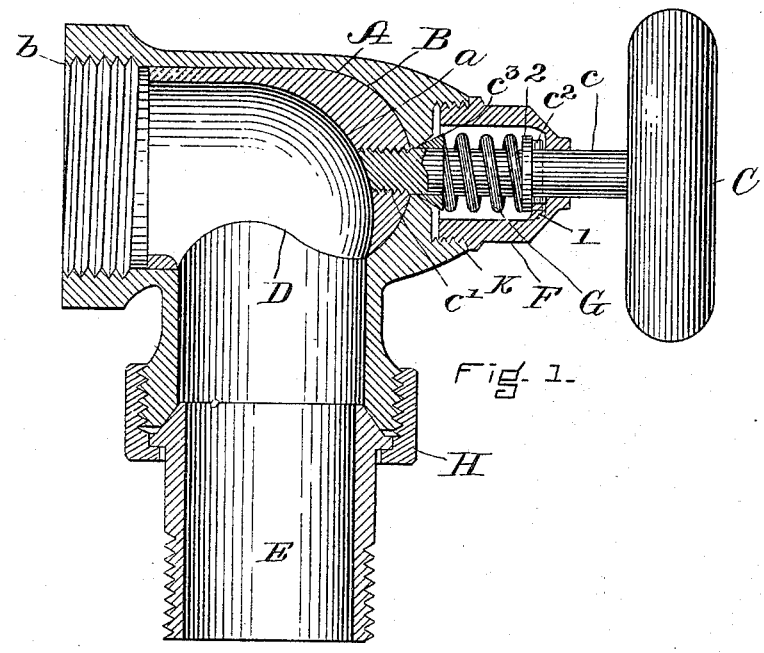
Figure 2:
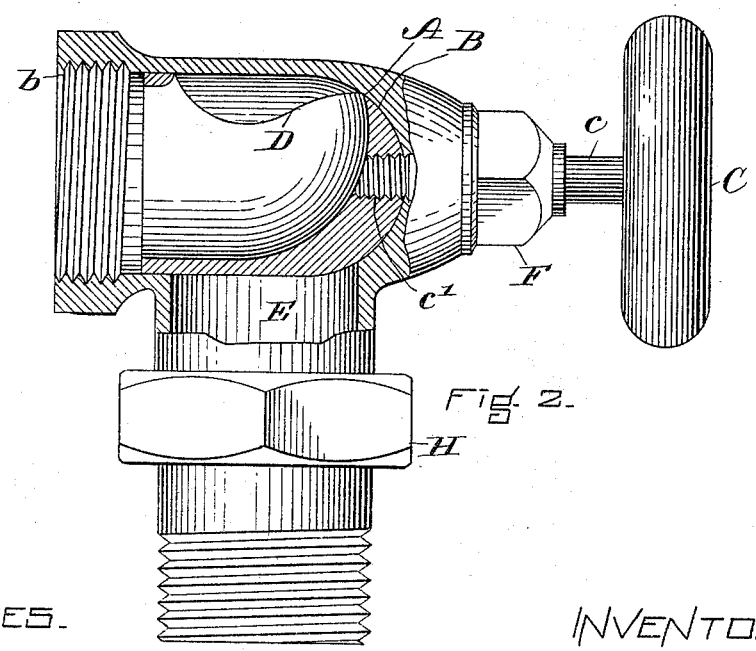

Figure 1 is a vertical section through the angle at the inlet or outlet of the radiator-pipes and through the valve, showing the valve open, and through the stuffing-box. Fig. 2 is a partial sectional view of the same, showing the valve closed.

Referring to said drawings, A is the valve proper, having the orifice D and the inner sloping surface $a$.

B is a pipe thickened at the angle.

E is a connecting-pipe.

H is a union fastening.

C is the handle of the spindle $c$, having the screw $c'$.

F is the housing or stuffing-box.

G is a spring.

Referring to the drawings, it will be seen that the contiguous surfaces of the valve A and the surrounding casing B closely fit each other. This is obtained by so grinding (either by instruments or one portion upon the other, which is the more accurate grinding) the valve portion proper, A, and its seat or casing B as to enable the valve to fit closely in its seat, so that whether the water be turned on or turned off there can be no leakage. This, in connection with the collar $c^3$, hereinafter described, also avoids the necessity of packing in the stuffing-box.

We avoid friction in the circulation of the water by forming the interior surface $a$ of the valve A so that the water will not turn a sharp corner upon the lower part of the pipe, but will follow a circular grade, as shown in Fig. 1.

We will now describe our construction.

In valve A is the aperture D of substantially the same size as that of the pipe E. The valve-handle C, having the spindle $c$, by its screw-shaped termination $c'$ joins the valve A. Into the base of the seat or casing B is fitted the housing or stuffing-box F, surrounding the spindle $c$ and screwed into place at K. The key $c^2$ runs through the spindle $c$ and abuts against stop 1, above which is the washer 2.

$c^3$ is an exteriorly-beveled ground washer upon the spindle $c$ and bearing against its seat in B. Between $c^3$ and the washer 2 is the spring G, the compression of which tends to hold the washer $c^3$ in position and the valve tightly in its seat. One end of the spring G bears against washer 2, which in turn bears against key $c^2$. The other end of the spring G bears against the beveled washer $c^3$, whose upper edge is in contact with its seat in the enlarged part of the pipe B. As shown in the drawings, the seat-bevel and the washer-bevel are not precisely parallel, so that contact is made between the two only at the extremity of the bevel, and as the washer slowly wears away this close fit will be retained. The pressure of the spring G upon the washer 2 and key $c^2$ and also upon the beveled washer $c^3$ is so great that the spring and both washers turn with the spindle $c$. The surfaces between $c^3$ and B are accurately ground to facilitate this turning of $c^3$. It will be seen that the spring G performs two functions in that it tends to force the washer $c^3$ constantly into its seat in B, so that any wear of $c^3$ is taken up as fast as made, and also by its pressure upon the washer 2 it tends to force the spindle and handle outwardly, and thereby to pull the valve A closely into its seat in B. The latter function of the spring G and the pressure of the water combine to hold the valve A closely into its seat in B.

The thickened portion B is formed, as shown in the drawings, in one of the pipe-angles, and the connecting-pipe E is properly connected with it by the union connection H or otherwise, and the pipe forming the continuation of B may be connected by being screwed into B at *b*.

The novel results produced by our invention are several, among them reducing the water friction by the smooth curved waterway, eliminating any necessity for packing in the housing or stuffing-box F by the novel construction of the casing or seat portion of the pipe B and the valve proper, A, by grinding, as above set forth, and the beveled washer $c^3$, the quick opening of the valve itself, since a one-half turn wholly opens or closes the circulation, and immunity from leakage, inasmuch as the greater the water-pressure the closer are the parts forced together. All these advantages are accompanied by lightness, durability, and a symmetrical form. The beveled washer $c^3$ is preferably made of Babbitt metal or hardened rubber, which in being pressed by spring G against its seat in B, similarly ground, tends for a long period to keep the surface of $c^3$ tight where it fits into the casing B. The same action tends also to crowd together the contiguous surfaces of the valve A and its seat B.

So far as we know we are the first to construct a valve to give a curved instead of a rectangular course to the hot water in water-heaters.

We claim—

1. In a valve for hot-water radiators the combination of the curved valve-seat B, the exteriorly and interiorly curved valve A, *a*, and a spindle, with a stuffing-box, a beveled washer $c^3$, seated in the valve-seat, and a spring set within said stuffing-box, normally acting with the pressure of water to hold the valve tight, and also acting to press upon and take up any wear of the washer $c^3$, substantially as described and shown.

2. In a valve for hot-water radiators the combination of the curved valve-seat B, the exteriorly and interiorly curved valve A, *a*, and a spindle *c*, stuffing-box F, adapted to be inserted in the valve-seat B, and properly perforated for the passage of said spindle; a key $c^2$, and washer 2, resting upon said key, and beveled washer $c^3$, surrounding said spindle and its apex situated in the valve-seat B, a helical spring G, one end bearing against said washer 2, and its other end bearing against said beveled washer $c^3$, the said key, washer, and spring turning with its handle, all substantially as described and shown.

In witness whereof we hereunto subscribe our names this 24th day of April, 1899.

WILLARD E. BLAKE.
RANDALL B. ANDROS.

In presence of—
F. C. CHAMBERLIN,
WILLIAM H. LEONARD.